Jan. 29, 1957 M. CHAMLIN 2,779,235
PERIMETERS
Filed July 21, 1953
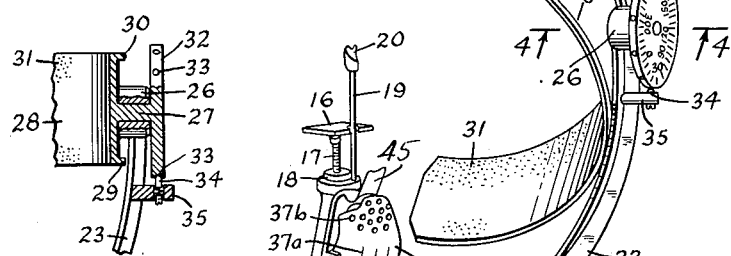
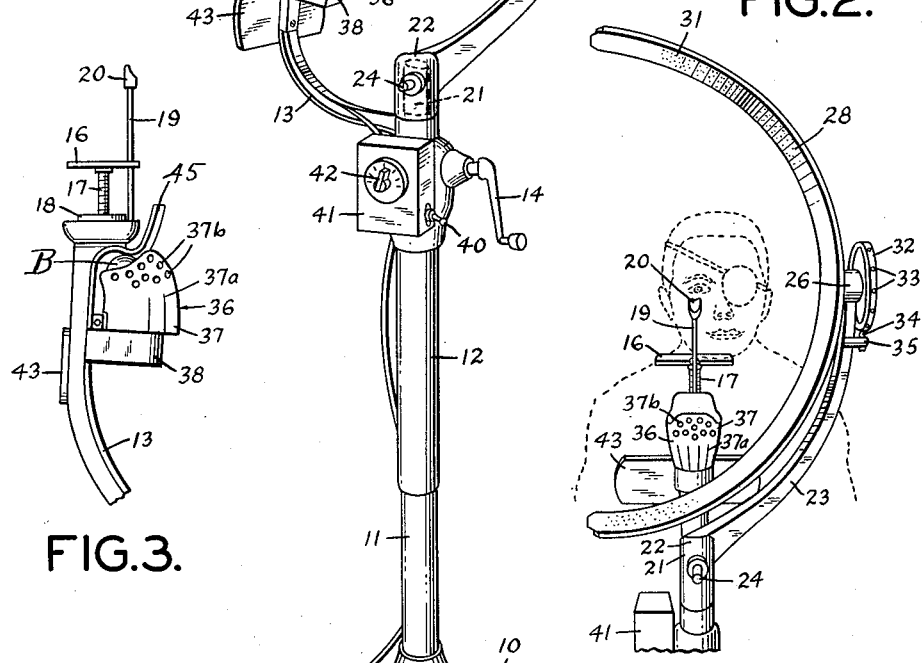
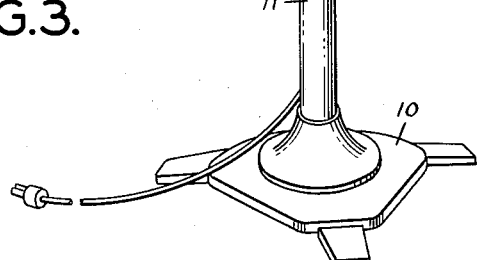
INVENTOR.
MAX CHAMLIN
BY
HIS ATTORNEYS.

2,779,235
PERIMETERS

Max Chamlin, New Rochelle, N. Y.

Application July 21, 1953, Serial No. 369,403

6 Claims. (Cl. 88—20)

This invention relates to optical instruments and it relates particularly to improvements in perimeters which are used for measuring the peripheral field of vision.

The measurement of the peripheral field of vision (perimetry) is now used in the diagnosis of various brain maladies, such as, tumors and ocular conditions, such as glaucoma, which affect thte vision, and can be detected by measuring variations in the peripheral field of vision.

A perimeter as referred to hereinafter is an apparatus used for measuring the peripheral field of vision. Perimeters are generally of two types. One type of perimeter is in the form of a hollow semisphere, which is illuminated from an outside light source. The patient is positioned in front of the hemisphere with his eyes at a fixed distance from the inner surface of the hemisphere, called a point of fixation. The field of vision can be measured by moving an object or a point of light around the inside of the hemisphere and making a record of the angular positions of the object from a fixed center line in which the object can be seen by the patient.

Another type of perimeter includes a curved band or arc which may be lined with a dark material and is illuminated from a light source which is carried by an arm extending outwardly from the arc. By moving a light-reflecting object along the arc and changing the angular position of the arc, it is possible to examine the field of vision of the patient undergoing the test.

Other smaller perimeters have been provided which can be held or worn by the patient while undergoing examination but the more commonly used types are mounted on a heavy base or on a table so that they will not be jarred or moved during the examination.

The prior types of perimeters have a number of practical disadvantages. The first and probably the lesser of these disadvantages is, that they are bulky and require an ophthalmic table for supporting and raising and lowering the perimeter. Usually these devices are used in conjunction with a tangent screen which is mounted across the room from the patient. After the patient has been examined with the perimeter, the perimeter must be wheeled out of position, or the patient must be moved to give an unobstructed field of vision for further examination with the tangent screen. The prior types of perimeters are not readily movable or displaceable, so that the doctor is inconvenienced and his examination made more difficult. Moreover, a different chin rest must be provided for examination with the tangent screen.

Another and more important defect of the prior perimeters is the lack of uniform illumination. In those perimeters having an overhead light which is mounted on an arm projecting from the perimeter, the light from one end of the arc to the other may be uniform but because the light is displaced to one side of the arc of perimeter, one edge of the arc has less light projected on it than the other edge. The lack of uniformity of illumination is critical when it is desired to find differences in the quality of vision on the nasal and temporal sides of the field of vision with either one eye or both eyes. The technique involved in this examination requires the perimeter arc to be positioned in a vertical plane and the left and right halves of the field of vision to be stimulated with exactly the same stimuli, the stimuli being of lesser and lesser intensity as the examination proceeds until an intensity is found which will be seen on one side and not seen on the other, or seen much better on one side than on the other. In order to keep such stimuli of equal strength on either side of the vertical meridian, that is, on the nasal and temporal sides at all times, the illumination on both sides of the arc of the perimeter must be exactly the same at all times. As indicated above, those perimeters involving the use of an offset arm are quite incapable of producing the uniform stimuli required in this operation because the light source is nearer one edge of the arc than the other. Moreover, in those types of perimeters having an offset arm for carrying the light source, the rotation of the arc is limited usually to less than 360° because of danger of breaking the electrical connection between the source of illumination and the power source.

In the hemisphere perimeters, it has never been possible to obtain precisely uniform illumination throughout, because of the impracticability of attempting to locate a light source at the center of the hemisphere. Both the patient and the light source cannot be present at the same point and as a consequence the hemisphere usually either is not provided with a source of illumination at all or with an offset arm type of illumination which will not provide uniform illumination.

The present invention involves substantial improvements over the prior types of perimeters and, in particular, is an improved arc type perimeter by means of which the perimeter arc may be illuminated uniformly from end to end and from edge to edge by means of a fixed source of light.

More particularly, my new perimeter has its arc mounted on an offset arm carried by a pedestal and is provided with means for latching it in fixed position with respect to the pedestal, or releasing it for movement into and out of the field of vision of the patient undergoing examination.

The new perimeter also is provided with a chin rest and a breast plate by means of which the head of the patient may be positioned accurately. It carries a source of illumination below the chin rest which is constructed and designed to give uniform illumination of the perimeter arc regardless of its position with respect to the patient and the light source. The new perimeter, therefore, enables not only the examination of the field of vision but also the comparison of the vision on the nasal and temporal sides of the eye when the arc is in the vertical meridian. Moreover, the mounting for the perimeter arc is such that it may be swung out of the way to enable the chin rest to be used for examining the patient with a tangent screen, and without moving the patient or the perimeter. Inasmuch as it is necessary frequently to examine the patient alternately with the perimeter and the tangent screen, the new perimeter is most advantageous because it enables the chin rest to be used for both types of examination without moving the patient or the perimeter.

For a better understanding of the present invention, reference may be had to the accompanying drawing in which:

Figure 1 is a perspective view of a perimeter of the type embodying the present invention;

Figure 2 is a view in front elevation of a portion of the perimeter illustrating the position of the arc when it is swung out of examining position;

Figure 3 is a view in side elevation of the chin rest and the source of illumination for the perimeter; and Figure 4 is a view in the section taken on line 4—4 of Figure 1.

While perimeters embodying the present invention may be made in several different forms, for example, for floor mounting, or for mounting on a table, the invention will be described herein with regard to a floor-supported perimeter. As shown in Figure 1, the perimeter includes a base 10 which may be provided with casters of the brake type in order to enable the base to be moved around the floor and then locked in position. The base is provided with an upwardly extending pedestal 11 on which is telescopically received the pedestal sleeve 12 carrying at its upper end an arm 13 projecting laterally therefrom. The pedestal sleeve 12 is connected by means of screw threaded shaft to the pedestal 11, and by means of the crank 14 and gearing interposed between the crank and the screw threaded shaft, the pedestal shaft 11 and the sleeve 12 may be moved relatively to vary the height of the device.

The arm 13 carries at its upper end an adjustable chin rest 16 consisting of a flat polished metal plate mounted on a screw threaded shaft 17 which engages in a nut 18 rotatably mounted on the upper end of the arm 13. By rotating the nut 18, the chin rest 16 may be elevated or lowered as required. The upper end of the arm 13 also carries the locating rod 19 having a flange 20 on its upper end which is to be positioned below the eye of the patient to locate it accurately in space.

The upper end of the pedestal sleeve 12 is provided with an extension 21 upon which is rotatably mounted a cup-shaped socket 22 on the lower end of an arcuate arm 23. The extension 21 has a series of notches or recesses formed in it to receive the end of a spring-biased plunger 24 to lock the arm 23 in position in front of the chin rest 16, or at right angles to the position of the chin rest as shown in Figure 2.

The upper end of the arm 23 is provided with a hub 26 through which extends a shaft 27 projecting from the center of the perimeter arc 28. The perimeter arc is an arcuate strip of metal of about 180° angular extent provided with reinforcing edge flanges 29 and 30. The inner surface of the arc 28 preferably is lined with black felt 31. The arc may be provided with transversely extending black threads dividing the arc into intervals of 10°.

The outer end of the shaft 27 carries a dial 32 having its face divided into angular units of measurement and having in its peripheral edge a series of recesses 33 spaced 30° apart. The recesses cooperate with a spring pressed member 34 mounted in an extension 35 on the outer side of the arm so that the arc 28 may be swung and held accurately in any of six angular positions. Of course, the arc can be moved to intermediate positions, if necessary.

In order to obtain accurate results with the perimeter, it is essential that the arc 28 of the perimeter be illuminated uniformly from end-to-end and edge-to-edge. To this end, I have provided a light source 36 of unique type which gives the quality of illumination desired. The light source 36 includes a plastic housing 37 in which is mounted an electric light bulb B. The housing 37 is mounted on a platform 38 extending inwardly from the side of the arm 13 below its top edge. The plastic lamp housing 37 is formed of translucent plastic which is thinner at its top than at its bottom and is provided with a series of facets 37a around its lower half, which produce a uniform distribution of light transversely but varying actually from top to bottom of the housing. Moreover, the top of the housing or casing is provided with rows of holes 37b therethrough in order to project light uniformly on the arc 28. The holes in the center of the rows are somewhat larger than the holes at the ends, to further assure uniform illumination of the arc 28. The light source 36 is a source of variable illumination but because of its unequal spacing from the arc 28, the inequality of illumination is designed to compensate for the varying distance between the arc and the light source. As a consequence, the arc is illuminated uniformly from top to bottom and from edge to edge. The light and its intensity may be controlled by means of a switch 40 in a switch box 41 on the pedestal sleeve 12 and a rheostat 42.

The perimeter may also be provided with other features which facilitate its use, for example, the arm 13 may be provided with a flat breast plate 43 below the level of the chin rest to protect the garments of the patient and also to steady the patient while undergoing examination. If desired, the plate 43 may be provided with the handles projecting from its ends to allow the patient to grip them during the examination.

A reversely curved shield plate 45 may be mounted on the arm 13 and extends over the light source 36 to shield the patient from the heat and light from the bulb B.

Also, if desired, a removable shield (not shown) may be detachably mounted on the arc 28 to block the light from the eyes of the doctor who is conducting the examination.

As indicated before, if desired, the pedestal 11, the arc 28 and associated mechanism may be mounted on a table or on any other type of pedestal or platform as may be desired. It will be understood that the perimeter is susceptible to further modification and that the form of the invention disclosed herein should be considered as illustrative and not as limiting the scope of the following claims.

I claim:

1. A perimeter for measuring the peripheral field of vision comprising a pedestal, a first arm fixed to and extending laterally and upwardly from said pedestal, a chin rest plate mounted on the outer end of said arm and adjustable vertically to position an eye of a patient at a predetermined place, a second arm mounted on and extending outwardly and upwardly from said pedestal and movable around the axis of said pedestal to positions in front of and to one side of said chin rest plate, a perimeter arc connected at about its mid-point to the upper end of said second arm for rotation about an axis passing through the center of said arc perpendicular to the axis of said pedestal, and means on said first arm below said chin rest for illuminating said arc uniformly from end to end and edge to edge.

2. The perimeter set forth in claim 1, comprising means on said first arm to shield the eyes of said patient from the illuminating means.

3. The perimeter set forth in claim 1, comprising means to releasably retain said second arm in front of and to one side of said chin rest plate and means to retain said arc releasably in any of a plurality of equally spaced angular relations to said arm.

4. The perimeter set forth in claim 1, in which said means to illuminate the arc comprises a translucent housing containing a lamp, the top portion of said housing being perforated to emit more light than the lower portion of the housing and the translucency varying to compensate for variations in the distance of the housing from said arc.

5. The perimeter set forth in claim 1, comprising a plate on said first arm below said chin rest to steady the patient and protect the patient's clothing.

6. The perimeter set forth in claim 1, in which said means to illuminate the arc comprises a housing containing a lamp, the housing being provided with perforations of varying light transmitting capacity to emit more light from the upper portion of the housing than from the lower portion of the housing to compensate for variations in the distance of the housing from said arc.

References Cited in the file of this patent

UNITED STATES PATENTS

| | | |
|---|---|---|
| 1,389,092 | Beach | Aug. 30, 1921 |
| 1,693,979 | Ferree et al. | Dec. 4, 1928 |
| 1,721,208 | Currier et al. | July 16, 1929 |
| 1,942,850 | Tillyer | Jan. 9, 1934 |
| 2,316,139 | Wottring | Apr. 6, 1943 |

FOREIGN PATENTS

| | | |
|---|---|---|
| 358,485 | Great Britain | Oct. 7, 1931 |

OTHER REFERENCES

Duke-Elder Test-Book of Ophthalmology, vol. 2, page 1182, reprinted January 1946, published by Mosby Co., London.

Rucker manual, "The Interpretation of Visual Fields," published by American Acadamy of Ophthalmology and Otolarynology in 1951.